United States Patent [19]

Schmitz

[11] 4,324,806

[45] Apr. 13, 1982

[54] METHOD FOR THE SOFTENING OF TOUGH MUSHROOMS

[76] Inventor: Helga Schmitz, Hofaekerstr. 1, 3575 Kirchhain 1, Fed. Rep. of Germany

[21] Appl. No.: 192,111

[22] PCT Filed: Jun. 5, 1979

[86] PCT No.: PCT/EP79/00043

§ 371 Date: Feb. 5, 1980

§ 102(e) Date: Feb. 5, 1980

[87] PCT Pub. No.: WO80/00001

PCT Pub. Date: Jan. 10, 1980

[30] Foreign Application Priority Data

Jun. 5, 1978 [DE] Fed. Rep. of Germany ....... 2824553

[51] Int. Cl.³ ............................................. A23L 1/212
[52] U.S. Cl. .................................... 426/52; 426/615; 426/388; 426/404
[58] Field of Search ................. 426/52, 10, 49, 321, 426/324, 615, 388, 404, 419, 655, 431

[56] References Cited

U.S. PATENT DOCUMENTS 3,615,721 10/1971 Silberman ............................. 426/50
4,143,167 3/1979 Blanchaud et al. ................. 426/615

FOREIGN PATENT DOCUMENTS 49-46069 12/1974 Japan ..................................... 426/52
1009430 11/1965 United Kingdom .

OTHER PUBLICATIONS

Tschirky, Oscar; "*Oscar*" *of the Waldorf's Cookbook*; Dover Publications Inc., N.Y., ®1973; p. 861.
Chem. Abst., vol. 77, No. 7, published on Aug. 14, 1972; "Steeping Preservation of an Edible Mushroom", Abstract No. 46818r.

*Primary Examiner*—Raymond N. Jones
*Assistant Examiner*—Elizabeth J. Curtin
*Attorney, Agent, or Firm*—Sughrue, Mion, Zinn, Macpeak and Seas

[57] ABSTRACT

A process for softening tough mushrooms or parts thereof by subjecting the mushrooms to an enzymatic treatment. The disclosed process makes possible the attainment of soft, edible mushroom fruit bodies having an agreeable consistency and good flavor. The process involves cleaning the mushroom material and subjecting the cleaned mushroom material to aerobic or anaerobic incubation in a sour solution having a pH value ranging from 3 to 5.5 and a salt percentage ranging from 0.02 to 0.5 mole. Glucanase or chitinase may also be added to the solution. Incubation is carried out at a temperature between 20° C. to 55° C. for a period ranging from 12 hours to 5 days. After incubation, the material is boiled and packed at a reduced pressure. The process makes possible the preservation of flavorful, edible mushroom material independent of mushroom harvesting seasons.

4 Claims, No Drawings

METHOD FOR THE SOFTENING OF TOUGH MUSHROOMS

BACKGROUND OF THE INVENTION

All pleurotos kinds which are cultivated have tough stems which account for approximately 20 to 25% of the production and which are thrown away as waste. The fruit body spoils easily. They get tougher through storage in a refrigerator. Freezing is only suitable after previous blanching. Dried mushrooms become like rubber after dehydration (TR. Gormely and F. O'Riordian, Lebensm.-Wiss. u. Techn., Bd.9 (1976) S 75-78). All other applied means of conservation require a more or less extensive heat treatment, but each heat treatment (blanching, cooking, sterilization, drying) increases the toughness of the fruit body and especially that of the stems.

Fermentation of the mushrooms was repeatedly tried in the past. Apart from the long duration, the adding of sugar and the lack of controlling the fermentation, this method was disadvantageous because the material had to be blanched. (W. Botticher, Technology der Pilzverwertung, Verlag Eugen Ulmer, 1974). Quick silaging (R. Kselig, Ceska, mykol, 10, 1956, p. 190) required previous boiling of the mushrooms for 10 to 15 minutes. Without sterilization the product lasted for only 2 to 3 days. Therefore, the previously used methods of conservation are not suitable.

SUMMARY OF THE INVENTION

The object of the invention is to provide soft, eatable mushrooms or parts of them, as well as a method to produce them from tough fruit bodies or parts of them unsuitable for consumption. Another object of the invention is to give the tough mushroom material a pleasant consistency and good taste.

Another objective of the invention is the conservation of the mushroom material without risking deterioration of consistency.

Yet another object is to render the preservation of the mushroom material independent of the harvest periods.

The solution to the inventive object is based on the development of an incubation method by using added enzymes or enzymes of the mushrooms themselves (glucanases and chitinases).

The invention hence relates to the object as characterized in the patent claims.

The method of the invention allows the conversion of fresh or differently long frozen or heat-treated tough mushroom bodies or parts thereof into a product having a soft, very pleasant consistency, appealing to the eye and having an appetizing aroma.

Moreover, the method allows the preservation of the mushroom product with simple means.

The method of the invention entails the following advantages:

1. Previously, mushroom stems had to be discarded because of their toughness. Due to this novel method it is possible for the first time, to make them usable for human consumption.

2. The new method provides tough mushroom fruit bodies and/or parts thereof with a pleasant soft consistency.

3. Any preservation method previously used required heat treatment which increases toughness of the mushrooms and parts theirof, and incurs costs. With the inventive method raw mushroom material can be used.

4. Mushroom material that has become tough due to heat treatment can also be provided with a pleasant consistency due to the novel method.

5. Mushroom material that has been frozen for any period of time can also be used with the inventive method since freezing does not affect the enzyme activities.

6. The inventive method allows heat treatment of the mushroom material even after the latter has become soft, without deteriorating the consistency.

7. Toughening of the mushroom material by heat treatment can be prevented by subjecting it to a short pre-treatment according to the inventive method.

8. The inventive method renders preservation independent of the harvesting periods since the mushroom material used can be stored in a deep-frozen condition for any period of time.

9. The inventive method also imparts a good preservation characteristic to the mushroom product.

10. The inventive method yields a mushroom product whose flavor can be varied according to the consumer's wishes.

11. The inventive method requires only a little expenditure in energy, time and costs.

The inventive method requires 2 essential steps:
(A) Preparation of the mushroom material
(B) Softening of the mushroom material through incubation.

Incubation can be followed by the following steps:
(C) Seasoning
(D) boiling and packaging.

DETAILED DESCRIPTION

The individual steps of the inventive method are explained in detail in the following:

(A) Preparation of the mushroom material

Starting materials include freshly harvested mushrooms, tough mushroom fruit bodies or their parts, for instance pleurotus types, or material frozen at −2° to −40° C. that has been stored up to two years, or material that became tough through heat treatment. The mushroom fruit bodies can be processed unwashed when the cultivation method provides clean material, otherwise they must be cleaned and washed. The mushroom fruit bodies are put into containers of any size, in whole or in bits and are then covered with the sour solution.

(B) Softening of the material

An acid solution in the range of pH 3 to pH 5.5 (preferably pH4) is used which may have a salt content of a molarity of 0.02 to 0.5 m (preferably 0.1 to 0.15). The fruit bodies or their parts get soft at temperatures of 20° to 55° C. (preferably 35° to 40°) after an aerobic or anaerobic incubation of 12 hours to 10 days. Especially buffer solutions can be used as acid solution, for instance acetic acid, citric acid, lactic acid or sour curdled milk from fermentive lactic fermentation. Enzymes are added to fruit bodies of mushroom strains which soften too slowly because they do not contain sufficient glucanases and chitinases, or to fruit bodies which have become tough due to heat treatment, such enzymes being added in the form of (a) enzyme-rich pieces of fruit body;
(b) solutions of enzyme-rich pieces of fruit bodies after the softening process;

(c) juice of enzyme-rich fruit bodies after storage in frozen condition;

(d) watery extracts made from comminuted enzyme-rich fresh or frozen fruit bodies;

(e) enzymes (glucanases and chitinases) which were separated with the organic solvents mixable with water or with high salt concentrations from the solutions (b)-(d);

(f) enzymes corresponding to (e), which were more or less cleaned.

(C) Seasoning

The softened mushroom product can be spiced with various seasonings as they are commonly used in the production of mushroom dishes, whereby an addition of table salt is possible even before the enzyme treatment.

(D) Cooking and packaging

In order to prevent the growth of mold and yeast, the finished product is boiled shortly (5 to 10 min) and closed under reduced pressure.

In order to check the softening of the mushroom fruit bodies or their parts the following consistence measurement was carried out:

The mushroom piece to be tested was placed in an upside-down cover of a petri dish (5 cm diameter) and the bottom of the dish was loaded with weights of 100 g (=300 Pa) up to 3 kg (=9000 Pa). Pieces which could be crushed up to 4500 Pa were defined as "soft".

The following examples illustrate the inventive method (examples 1-7 for steps (A) and (B), examples 8 and 9 for steps (C) and (D)):

EXAMPLE 1

(A) Fresh stems of pleurotus ostreatus, Symycel 3004 strain, were used as material. The stems were cleaned, cut into pieces of roughly 1 g in weight, and filled into either small containers (=k, test tubes 25×250 mm) or medium-sized containers (=m, ¼ l screw cover glasses) or in large containers (=g, 1 l canning glasses).

(B) The prepared material was covered with 0.15 m lactic acid buffer (a) or with 0.15 m citric acid buffer (b), both pH 4, and incubated for 48 h at 40° C. (see table 1).

TABLE 1

Softening of fresh, enzyme-rich material in citric acid or lactic acid buffer

| % soft pieces after | | | container |
|---|---|---|---|
| 24 h | 48 h | buffer | size |
| 100 | 100 | (a) | k |
| 90 | 100 | (a) | m |
| 100 | 100 | (a) | g |
| 90 | 100 | (b) | k |
| 90 | 100 | (b) | m |
| 100 | 100 | (b) | g |

EXAMPLE 2

(A) *Stems of Pl.ostreatus,* Somycel 3004 were used as material, which had been stored at −18° C. for different periods of time. The material was prepared as in example 1.

(B) The stem pieces were covered with 0.15 m citric acid buffer of 4 pH and incubated for 24 hours or 48 hours at 40° C. (see Table 2).

EXAMPLE 3

(A) Fresh stems from *pleurotus ostreatus,* Somycel 3004 or Florida strain, which had been stored for 3 month at −18° C., were used as material. The material was prepared as in example 1 and subsequently heated to 121° C. for 5 minutes so that all softening enzymes were destroyed.

(B) After that, fresh pieces of *pleurotus ostretus,* Somycel 3004 strain, were added the ratio of 1:1, covered with lactic acid buffer of pH 4 and incubated at 40° C. for three days (see table 3).

TABLE 2

Softening of enzyme-rich stem pieces which were stored in lactic acid buffer at −18° C. for different periods of time

| % soft pieces after | | freezing time | container |
|---|---|---|---|
| 24 h | 48 h | (month) | size |
| 90 | 100 | 1 | k |
| 100 | 100 | 1 | m |
| 90 | 100 | 1 | g |
| 100 | 100 | 3 | k |
| 100 | 100 | 3 | m |
| 100 | 100 | 3 | g |
| 100 | 100 | 6 | k |
| 80 | 100 | 6 | m |
| 90 | 100 | 6 | g |
| 100 | 100 | 9 | k |
| 80 | 100 | 9 | g |
| 90 | 100 | 12 | k |
| 90 | 100 | 12 | g |

TABLE 3

Softening of heat-treated stem pieces by addition of fresh enzyme-rich stem pieces

| | Container | % soft pieces of | | | |
|---|---|---|---|---|---|
| | | Somycel 3004 | | Florida | |
| Treatment | size | fresh | frozen | fresh | frozen |
| heated to 121° C. | k | 0 | 0 | 0 | 0 |
| | m | 0 | 0 | 0 | 0 |
| | g | 0 | 0 | 0 | 0 |
| heated to 121° C. plus fresh stem pieces | k | 100 | 100 | 100 | 100 |
| | m | 100 | 100 | 100 | 100 |
| | g | 100 | 100 | 100 | 100 |

EXAMPLE 4

(A) The material was prepared in the same manner as in Example 3.

(B) The enzyme-containing buffer solution was separated by filtering from the material that was treated for 48 hours as described in Examples 1 and 2, and then added to the prepared material. It was incubated for 5 days at 40° C. (see table 4).

TABLE 4

Softening of heat-treated stem pieces by adding an enzyme-containing material buffer solution

| | Container | % soft pieces of | | | |
|---|---|---|---|---|---|
| | | Somycel 3004 | | Florida | |
| Treatment | size | fresh | frozen | fresh | frozen |
| heated to 121° C. | k | 0 | 0 | 0 | 0 |
| | m | 0 | 0 | 0 | 0 |
| | g | 0 | 0 | 0 | 0 |
| heated to 121° C. + solution from example 1 | k | 100 | 100 | 100 | 100 |
| | m | 100 | 100 | 100 | 100 |
| | g | 100 | 100 | 100 | 100 |
| heated to 121° C. + solution from example 2 | k | 100 | 100 | 100 | 100 |
| | m | 100 | 100 | 100 | 100 |
| | g | 100 | 100 | 100 | 100 |

EXAMPLE 5

(A) Material and preparation as in example 3

(B) Stems of *Pl.ostreatus,* Somycel 3004 which were frozen at −18° C. for different periods, were squeezed after thawing to 2° C. The juice was titrated to pH 4 with 1 m citric acid, and filtered at sterile conditions. The solution was added to the prepared material. It was then incubated for 5 days at 40° C. (see Table 5).

TABLE 5

Softening of heat-treated stem pieces by adding enzyme-containing

| | | % soft pieces of | | | |
|---|---|---|---|---|---|
| | Container | Somycel 3004 | | Florida | |
| Treatment | size | fresh | frozen | fresh | frozen |
| Reference: | k | 0 | 0 | 0 | 0 |
| heated to | m | 0 | 0 | 0 | 0 |
| 121° C. | g | 0 | 0 | 0 | 0 |
| heated to | k | 100 | 100 | 100 | 100 |
| 121° C. + squeezed | m | 100 | 100 | 100 | 100 |
| juice | g | 100 | 100 | 100 | 100 |

EXAMPLE 6

(A) Material and preparation as in example 3

(B) Both fresh and frozen stems of *Pl.ostreatus,* Somycel 3004 strain were cut into pieces and put into a Waring Blender, for homogenization with acetic acid buffer at pH 4 while being cooled, this procedure taking 10 minutes, then it was centrifuged. The resulting enzyme-rich solution was added to the prepared material. It was incubated for 5 days at 40° C.

TABLE 6

Softening of heat-treated stem pieces by adding watery extracts from enzyme-rich material

| | % soft pieces of | | | |
|---|---|---|---|---|
| | Somycel 3004 | | Florida | |
| Treatment | fresh | frozen | fresh | frozen |
| Reference: heated to 121° C. | 0 | 0 | 0 | 0 |
| heated to 121° C. + extract from fresh stems | 100 | 100 | 100 | 100 |
| heated to 121° C. + extract from frozen stems | 100 | 100 | 100 | 100 |

EXAMPLE 7

(A) Only frozen stems of *Pl.ostreatus,* Somycel 3004 were used as material, which were prepared as in example 3, except that only small containers were used.

(B) Enzymes were extracted from enzyme-rich solutions like buffer solutions from softened stems according to example 1 and 2, squeezed juices, and watery extracts from enzyme-rich stems according to example 5 and 6:

(a) The cooled solution was mixed with acetone at a ratio of 1:4. The resulting precipitation was centrifuged off in the cold and washed twice with cold acetone and once with cold diethylether.

(b) Ammonium sulfate was added to the cooled solution to a 80% saturation, the precipitate was centrifuged off and washed twice with 80% ammonium sulfate. The centrifuged product was mised with crystalline ammonium sulfate to a 100% saturation. The resulting precipatate was also centrifuged off and washed twice with 100%—i.e. saturated—ammonium sulfate solution. The precipitated enzymes from (a) and (b) were either used directly or frozen at −18° C. or freeze-dried.

Prior to being used, the enzyme preparation was separated from the pH4 in a 0.15 m citric acid buffer, so that an enzyme solution was obtained which was ten times more concentrated than the original solution. One part of this solution was used directly, another part was first dialyzed with a buffer solution at 2° C.−4° C. for 8 hours. The sour enzyme solution was added to the prepared stem pieces and incubated for three days at 40° C.

TABLE 7

Softening of heat-treated stem pieces with enzyme preparations

| Precipitation of the enzyme with | Application of the enzyme | % soft stems of Somycel 3004 |
|---|---|---|
| acetone | direct | 100 |
| acetone | frozen | 100 |
| acetone | freeze-dried | 100 |
| 80% (NH$_4$)$_2$SO$_4$ | direct | 100 |
| 80% (NH$_4$)$_2$SO$_4$ | frozen | 100 |
| 80% (NH$_4$)$_2$SO$_4$ | freeze-dried | 100 |
| 100% (NH$_4$)$_2$SO$_4$ | direct | 100 |
| 100% (NH$_4$)$_2$SO$_4$ | frozen | 100 |
| 100% (NH$_4$)$_2$SO$_4$ | freeze-dried | 100 |

The results are the same for unwashed and dialyzed enzymes.

The proteins which were extracted with the ammonium sulfate were tested for glucanase and chitinase activity. Taken as the substrate for the tests was (according to the instructions by J. G. H. Wessel (Wentia, Bd. 13 (1965), p. 1–113) isolated R-glucane and colloidal chitin which was produced from chitin in accordance with the instructions by L. R. Berger and D. M. Reynolds (Biochim. Biophys. Acta, Bd. 29 (1958).

The glucose determination was done with the Merck-o-test blood sugar (Merck No. 3306) glucosamine determination with Indol according to Z. DISCHE (in Glick, Methods of biochemical analysis, Vol. 2, p. 353, Interscience Publishers, New York, 1955), after one hour of the enzymes taking an influence on the substrate (see table 8).

TABLE 8

| Protein extracted with | Glucose from R-glucane | Glucose from S-glucane | Glucose from Chitin |
|---|---|---|---|
| 80% (NH$_4$)$_2$SO$_4$ | +++ | + | ++ |
| 100% (NH$_4$)$_2$SO$_4$ | ++ | (+) | ++ |

+++:strong reaction
++:distinct reaction
:weak reaction
(+):very weak reaction

The methods applied in Examples 1 to 7 were repeated with lactic acid which occurs during lactic fermentation. Substantially the same results are obtained.

EXAMPLE 8

The softened stems from example 1 were seasoned with salt, pepper, onions and bay leaves, cooked for 5 minutes and vacuum-packed.

EXAMPLE 9

The softened stems from example 2 were seasoned with salt, sugar, peeled horse-radish and some cloves, boiled for ten minutes and then vacuum-packed.

I claim:

1. A method for treating tough mushrooms, comprising the steps of:
   placing cleaned mushroom material within a container;
   adding a solution to said mushroom material within said container, said solution comprising a liquid having a pH of from 3 to 5.5 and having a salt percentage of 0.02 to 0.5 molar; and
   allowing said mushroom material and said solution to interact in the presence of an enzyme selected from the group consisting of glucanase and chitinase at a temperature of from 20° C. to 55° C. for a period ranging from 12 hours to 5 days said enzyme being added to said solution in an amount in excess of what is naturally in said mushroom material, said amount of enzyme being sufficient to increase the softening of said mushroom material.

2. A method as claimed in claim 1 wherein said liquid having a pH ranging from 3 to 5.5 is selected from the group consisting of acetic acid, citric acid, lactic acid, or sour curdled milk from fermented lactic fermentation.

3. A method as claimed in claim 2 wherein the pH of said liquid is approximately 4.

4. A method as claimed in claim 1, further comprising the steps of boiling said solution containing said mushroom material; and
   packaging said mushroom material under reduced pressure.

* * * * *